US008612638B2

(12) United States Patent
Kawaguchi

(10) Patent No.: US 8,612,638 B2
(45) Date of Patent: Dec. 17, 2013

(54) WIRELESS CONNECTION SYSTEM THAT CONNECTS HOST AND DEVICES BY RADIO, INITIAL CONNECTION METHOD THEREFOR, STORAGE MEDIUM THAT STORES CONTROL PROGRAM THEREFOR, INFORMATION PROCESSING APPARATUS AND IMAGE FORMING APPARATUS THAT CONSTITUTE THE SYSTEM

(75) Inventor: Tadashi Kawaguchi, Tokyo (JP)

(73) Assignee: Canon Kabushiki Kaisha (JP)

( * ) Notice: Subject to any disclaimer, the term of this patent is extended or adjusted under 35 U.S.C. 154(b) by 185 days.

(21) Appl. No.: 12/943,696

(22) Filed: Nov. 10, 2010

(65) Prior Publication Data

US 2011/0125931 A1 May 26, 2011

(30) Foreign Application Priority Data

Nov. 25, 2009 (JP) .................................. 2009-267293

(51) Int. Cl.
*G06F 3/00* (2006.01)

(52) U.S. Cl.
USPC ...... 710/10; 710/8; 710/9; 710/104; 713/168; 726/27

(58) Field of Classification Search
None
See application file for complete search history.

(56) References Cited

U.S. PATENT DOCUMENTS

| 7,502,629 | B2 * | 3/2009 | Vanhatalo et al. ............ 455/558 |
| 7,529,935 | B2 * | 5/2009 | Saito et al. .................... 713/168 |
| 7,685,322 | B2 * | 3/2010 | Bhesania et al. .................. 710/8 |
| 7,778,422 | B2 | 8/2010 | Freeman et al. |
| 7,870,305 | B2 * | 1/2011 | Maszak et al. .................. 710/17 |
| 7,987,304 | B2 * | 7/2011 | Aytur et al. ..................... 710/72 |
| 8,028,111 | B2 * | 9/2011 | Takahashi ..................... 710/106 |
| 2005/0193203 | A1 | 9/2005 | Freeman et al. |
| 2007/0067628 | A1 * | 3/2007 | Kim et al. ...................... 713/168 |
| 2007/0157020 | A1 * | 7/2007 | Lee et al. ........................ 713/155 |
| 2008/0003556 | A1 * | 1/2008 | Takahashi et al. ......... 434/307 R |
| 2008/0130553 | A1 * | 6/2008 | Takahashi .................... 370/328 |

(Continued)

FOREIGN PATENT DOCUMENTS

JP          2005-244988 A1    9/2005
JP          2009213010 A   *  9/2009

OTHER PUBLICATIONS

'Wireless Universal Serial Bus Specification,' Revision 1.0, May 12, 2005, pp. i, 76, 121-123, 127-129.*
Machine Translation of JP 2009-213010A.*

(Continued)

*Primary Examiner* — Steven Snyder
(74) *Attorney, Agent, or Firm* — Rossi, Kimms & McDowell LLP

(57) ABSTRACT

A wireless connection system capable of reducing a load on a user when constructing wireless connection environment including a host and devices. A wireless connection system comprises a host computer, a first device that has established a wireless connection with the host computer based on first association information, and a second device that has not established the wireless connection with the host computer. The host computer generates second association information for the wireless connection with the second device, and transmits the second association information to the first device by radio. The first device stores the second association information into a removable memory device when equipped with the removable memory device. The second device acquires the second association information from the removable memory device when equipped with the removable memory device that stores the second association information, and communicates with the host computer by radio based on the second association information.

11 Claims, 11 Drawing Sheets

(56) References Cited

U.S. PATENT DOCUMENTS

| | | | |
|---|---|---|---|
| 2008/0222315 A1* | 9/2008 | Maszak et al. | 710/14 |
| 2009/0119427 A1* | 5/2009 | Takahashi | 710/106 |
| 2010/0199358 A1* | 8/2010 | Yao | 726/27 |
| 2011/0212724 A1* | 9/2011 | Wirtanen et al. | 455/435.2 |

OTHER PUBLICATIONS

Machine Translation of JP 2009-213010A, published Sep. 2009.*

* cited by examiner

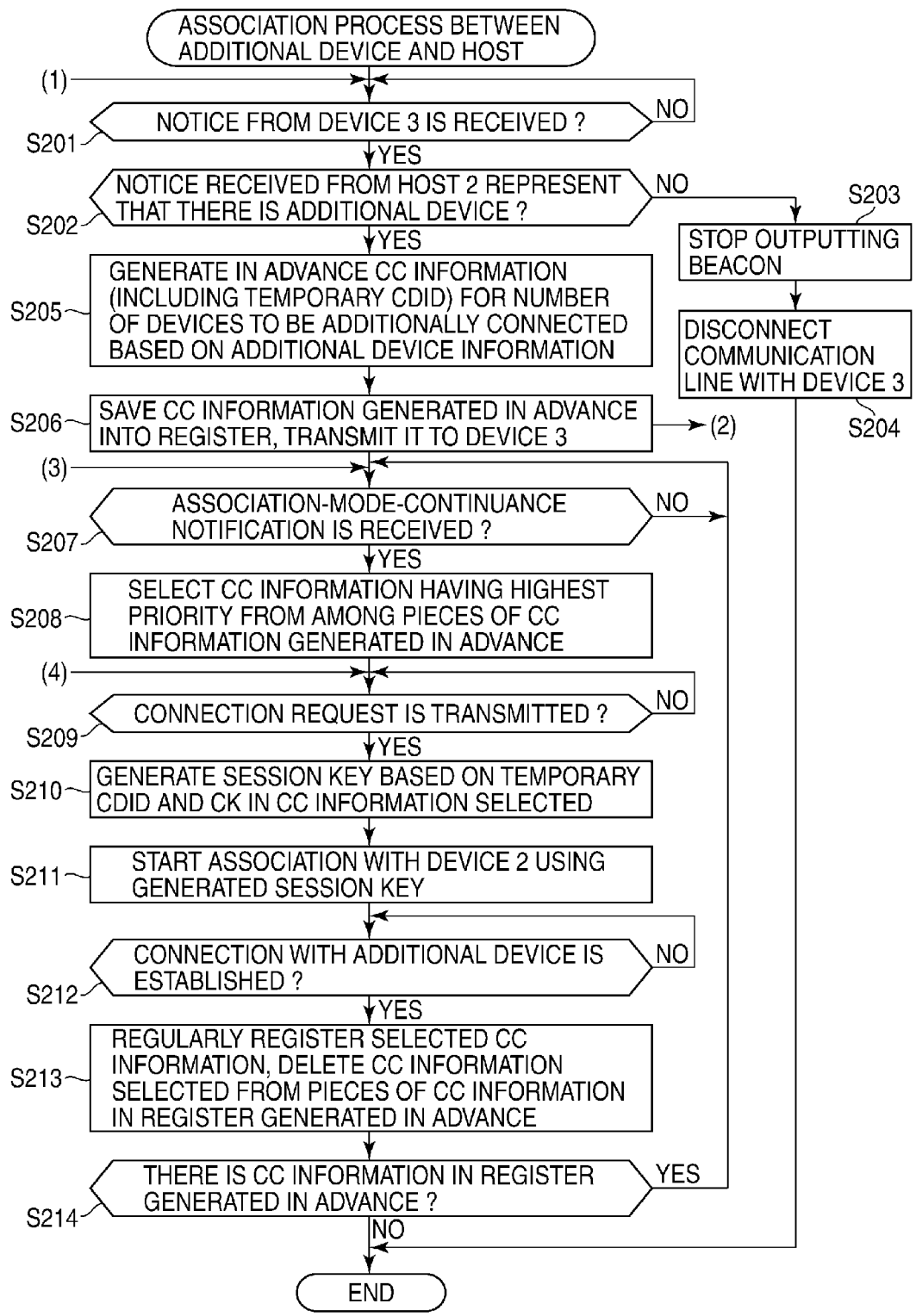

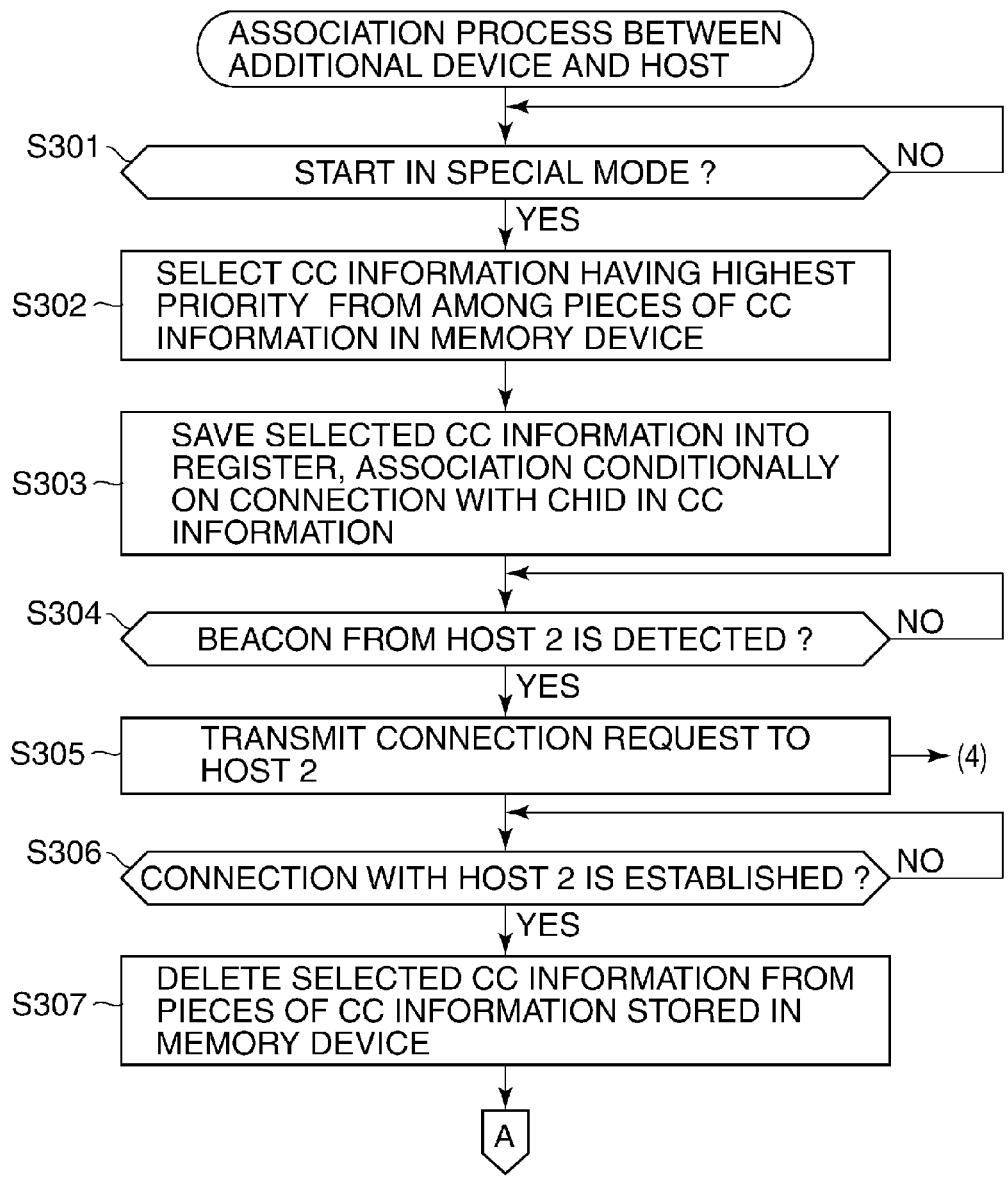

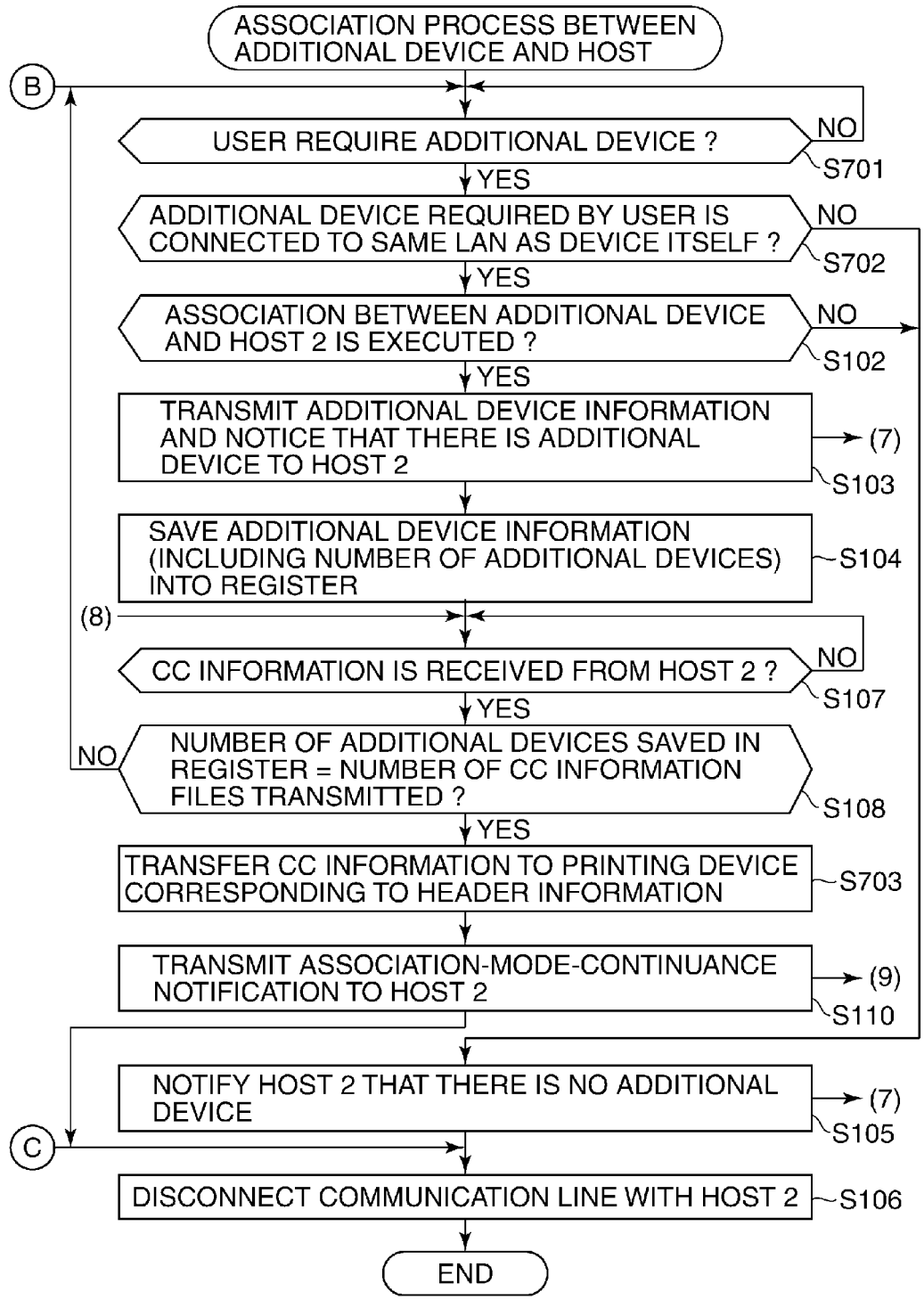

WIRELESS CONNECTION SYSTEM THAT CONNECTS HOST AND DEVICES BY RADIO, INITIAL CONNECTION METHOD THEREFOR, STORAGE MEDIUM THAT STORES CONTROL PROGRAM THEREFOR, INFORMATION PROCESSING APPARATUS AND IMAGE FORMING APPARATUS THAT CONSTITUTE THE SYSTEM

BACKGROUND OF THE INVENTION

1. Field of the Invention

The present invention relates to a wireless connection system that connects a host computer and devices by radio, an initial connection method therefor, a storage medium that stores a control program therefor, an information processing apparatus and an image forming apparatus that constitute the system.

2. Description of the Related Art

Conventionally, there is a known technique that shares information called connection context (referred to as "CC", hereafter) between host computers (referred to as "hosts", hereafter) and printing devices (referred to as "devices", hereafter) in order to establish secure connections among the hosts and the devices when constructing a wireless communications environment.

When using this technique, it is necessary to prepare the same number of CCs as the number of devices to be connected in order to connect the devices to the hosts. The CC consists of a unique host ID (referred to as a "CHID", hereafter), a unique device ID (referred to as a "CDID", hereafter), and a connection key (referred to as a "CK", hereinafter) shared between the host ID and the device ID. There is a restriction that the host must not distribute the same CK among a plurality of devices.

Accordingly, the conventional technique employs a cable association using a USB cable or a numeric association that requires to input a predetermined number to both of the host and the device, at the time of an initial connection (referred to as an "association", hereafter) between the certain host and the certain device in order to share the CC between the host and the device.

In an environment where a plurality of hosts and a plurality of devices are prepared, when a plurality of devices are to be connected to a certain host in a wireless communications environment, it is necessary to extract one-to-one host-device environment and to execute the association to each.

Although it differs from the wireless communications environment, the following techniques are known as a method of establishing connection between a local device and a remote device or between nodes via network environment. First, a local device generates an open value and a secret value, and imports an open value from a remote device via an out-of-band mechanism. Then, the local device generates a new secret value as a function of the open value imported from the remote device and the secret value generated by the local device. Further, the local device generates a symmetrical key for establishing the connection using the newly generated secret value (for example, see Japanese Laid-Open Patent Publication (Kokai) No. 2005-244988 (JP 2005-244988A)).

However, the conventional method of constructing the wireless communications environment must repeat the operation to extract a one-to-one host-device combination from among the environment including hosts and devices and to execute the association at the combination number of times. Therefore, a user as a manager is required to connect a USB cable and to input codes via an operation unit for each combination extracted in order to share the CC between the device and the host, which becomes a significant load on the user.

When the generating means of the symmetrical key described in Japanese Laid-Open Patent Publication (Kokai) No. 2005-244988 (JP 2005-244988A) is converted into the wireless communications environment, although the security and reliability between a local device and a remote device or between nodes can be improved, the load on the user concerning the association cannot be reduced.

SUMMARY OF THE INVENTION

The present invention provides a wireless connection system, an initial connection method therefor, a storage medium that stores a control program therefor, an information processing apparatus and an image forming apparatus that constitute the system, which are capable of reducing a load on a user at the time when constructing wireless connection environment in environment including a host and devices.

Accordingly, a first aspect of the present invention provides a wireless connection system comprising a host computer, a first device that has established a wireless connection with the host computer based on first association information, and a second device that has not established the wireless connection with the host computer. The host computer comprises a generation unit configured to generate second association information for the wireless connection with the second device, and a transmission unit configured to transmit the second association information to the first device by radio. The first device comprises a storing unit configured to store the second association information into a removable memory device when equipped with the removable memory device. The second device comprises an acquisition unit configured to acquire the second association information from the removable memory device when equipped with the removable memory device that stores the second association information, and a communications unit configured to communicate with the host computer by radio based on the second association information acquired by the acquisition unit.

Accordingly, a second aspect of the present invention provides an initial connection method for a wireless connection system having a host computer, a first device that has established a wireless connection with the host computer based on first association information, and a second device that has not established the wireless connection with the host computer, the method comprising a generation step, which is executed by the host computer, of generating second association information for the wireless connection with the second device, a transmission step, which is executed by the host computer, of transmitting the second association information to the first device by radio, a storing step, which is executed by the first device, of storing the second association information into a removable memory device when equipped with the removable memory device, an acquisition step, which is executed by the second device, of acquiring the second association information from the removable memory device when equipped with the removable memory device that stores the second association information in the storing step, and a communications step, which is executed by the second device, of communicating with the host computer by radio based on the second association information acquired in the acquisition step.

Accordingly, a third aspect of the present invention provides a computer-readable storage medium storing a control program causing a computer to execute the initial connection method of the wireless connection system according to the second aspect.

Accordingly, a fourth aspect of the present invention provides an information processing apparatus that constitutes the host computer included in the wireless connection system according to the first aspect.

Accordingly, a fifth aspect of the present invention provides an image forming apparatus that constitutes the first device included in the wireless connection system according to the first aspect.

Accordingly, a sixth aspect of the present invention provides an image forming apparatus that constitutes the second device included in the wireless connection system according to the first aspect.

According to the present invention, the load on the user at the time when constructing the wireless communications environment in the environment including the host and the devices can be reduced.

Further features of the present invention will become apparent from the following description of exemplary embodiments with reference to the attached drawings.

BRIEF DESCRIPTION OF THE DRAWINGS

FIG. 5A, FIG. 5B, and FIG. 5C are flowcharts showing procedures of an association process between an additional device and the host in the wireless connection system in FIG. 4.

FIG. 7A, FIG. 7B, and FIG. 7C are flowcharts showing procedures of an association process between an additional device and the host in the wireless connection system in FIG. 6.

DESCRIPTION OF THE EMBODIMENTS

Hereafter, embodiments according to the present invention will be described in detail with reference to the drawings.

Figure 1:
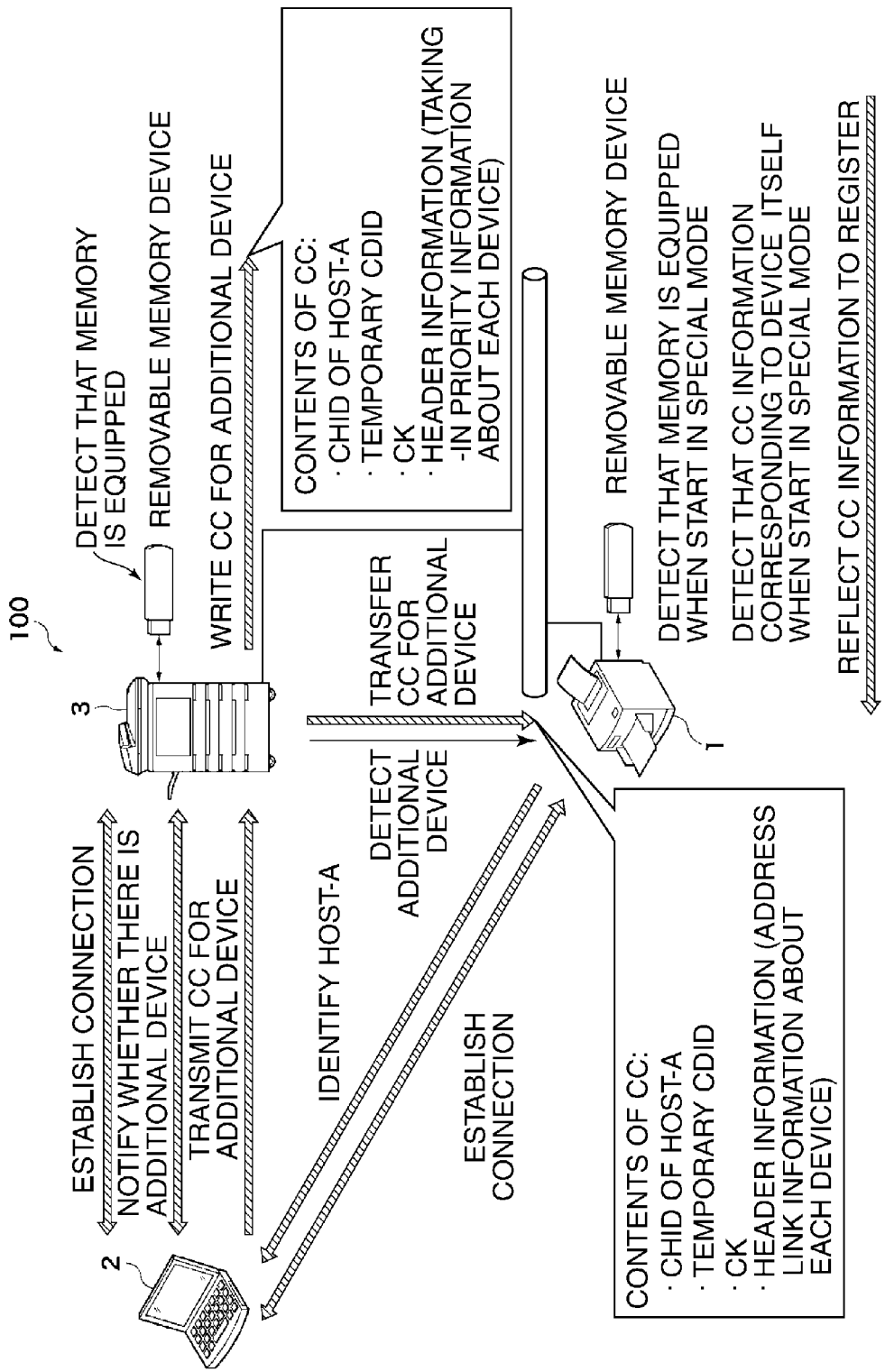
FIG. 1 is a view showing a part of a wireless connection system according to a first embodiment of the present invention together with a connection establishment procedure.

FIG. 1 is a view showing a part of a wireless connection system according to a first embodiment of the present invention together with a connection establishment procedure.

In FIG. 1, the wireless connection system 100, which is capable of establishing a wireless connection between host computers (referred to as "hosts", hereafter) and printing devices (referred to as "devices", hereafter), has a host 2, a device 1 and a device 3 that are connectable by radio.

Figure 2:
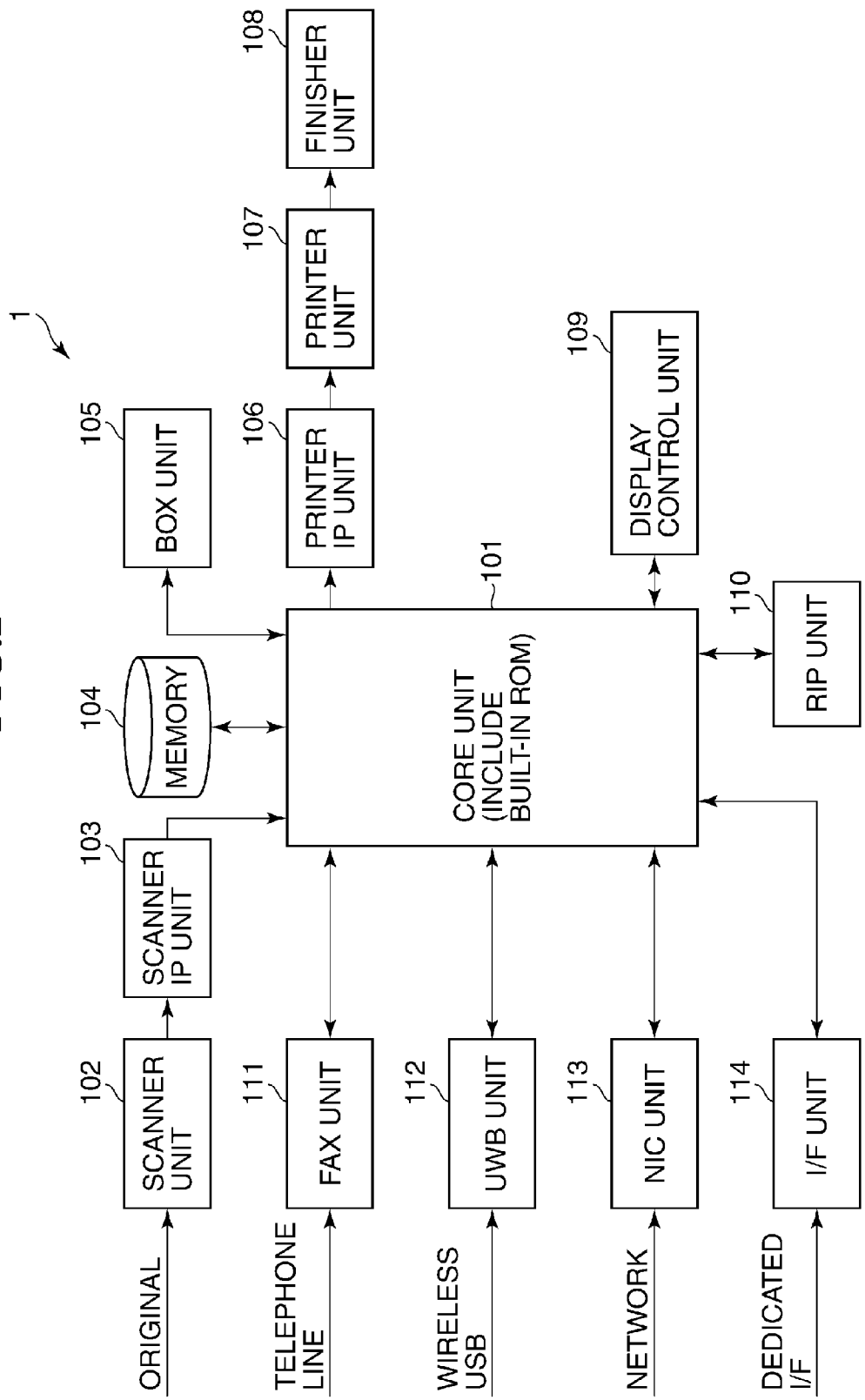
FIG. 2 is a block diagram schematically showing an internal configuration of a device shown in FIG. 1.

FIG. 2 is a block diagram schematically showing an internal configuration of the device 1 shown in FIG. 1. As shown in FIG. 2, a core unit 101 is connected to a scanner IP unit 103 and a printer IP unit 106. Accordingly, the core unit 101 totally controls the device 1 as a whole. For example, the core unit 101 executes an image forming operation by controlling accesses to a scanner unit 102 and a printer unit 107 according to instructions from a user inputted via a display control unit 109, and communicates with an I/F unit 114.

A ROM (not shown) is built in the core unit 101. The ROM stores a boot program for starting an operating system and a system bootable program for totally controlling the device as a whole. The ROM stores bootable programs that describe control procedures to implement functions including a scanning function, a print function, a facsimile function, and a file transmission (SEND). The ROM also stores a NIC bootable program that describes a communications control procedure with external information devices, a PDL bootable program that describes a raster-data generation procedure, etc.

The scanner unit 102 reads an original image by a photoelectric transducer, converts an analog signal of the read image into a digital signal (an A/D conversion), and applies a shading correction to the signal, in order to generate an RGB digital image. The scanner unit 102 includes a ROM that stores a program for driving a paper feeder, a conveyer, and an optical system, and for controlling various sensors that are related to a scan operation, and a program for correcting, controlling, and transmitting input/output image data.

The scanner IP unit 103 includes a scanner IP that is a circuit block for applying a reader-related image processing to the RGB digital image data outputted from the scanner unit 102. Here, the IP means an IP core that is partial hardware circuitry information organized by a function when the control circuit is configured by an LSI or the like.

A memory unit 104 is a read/write memory device that functions as a main memory of the core unit, and is used for a work area relating a drawing process and for a deployment area of printout data. The memory unit 104 holds association information required for an initial connection (referred to as an "association", hereafter) for establishing a wireless connection with the host 2 mentioned later.

A box unit 105 stores images as a buffer area used when transmitting and receiving the data from an external I/F unit.

The printer IP unit 106 includes a printer IP that is a circuit block for applying a print-related image processing to each of YMCK color component signals outputted from the core unit to generate an output video signal.

The printer unit 107 develops, transfers, and fixes the output video signal onto a recording paper in accordance with a print operation start. The printer unit 107 includes a built-in ROM (not shown). This ROM stores a program for driving a paper feeder, a conveyer, and an optical system, and for controlling various sensors that are related to a print operation, and a program for a high voltage control to form an image, for controlling a laser scanner unit, a development unit, and a fixing unit, for controlling output video date, and for controlling a finishing function that will be mentioned later, etc.

A finisher unit 108 applies post processes such as sorting and stapling to the recording paper outputted from the printer unit.

The display control unit 109 communicates with the core unit, detects a depression of a key, and displays statuses that show various system conditions.

A RIP unit 110 generates raster pattern data based on print information from the external information devices.

A FAX unit 111 is connected to an analog/digital public telephone line, and transmits and receives an image. The FAX unit 111 stores a program for controlling the public telephone line, transferring transmitting/receiving image data, and for setting the transferring, etc.

A UWB unit 112 includes an MAC/BB control unit, a data conversion unit, and an RF control unit in its inside, behaves like a device based on a UWB protocol, and controls the wireless communications with the external information devices.

An NIC unit 113 controls communications with the external information devices via a network, and performs information recording processes of various applications.

The I/F unit 114 has an interface specifically designed to control a removable memory (a USB storage unit, for example), an image pickup apparatus, a card reader that enables fee collection control and section specification control, etc.

Figure 3:
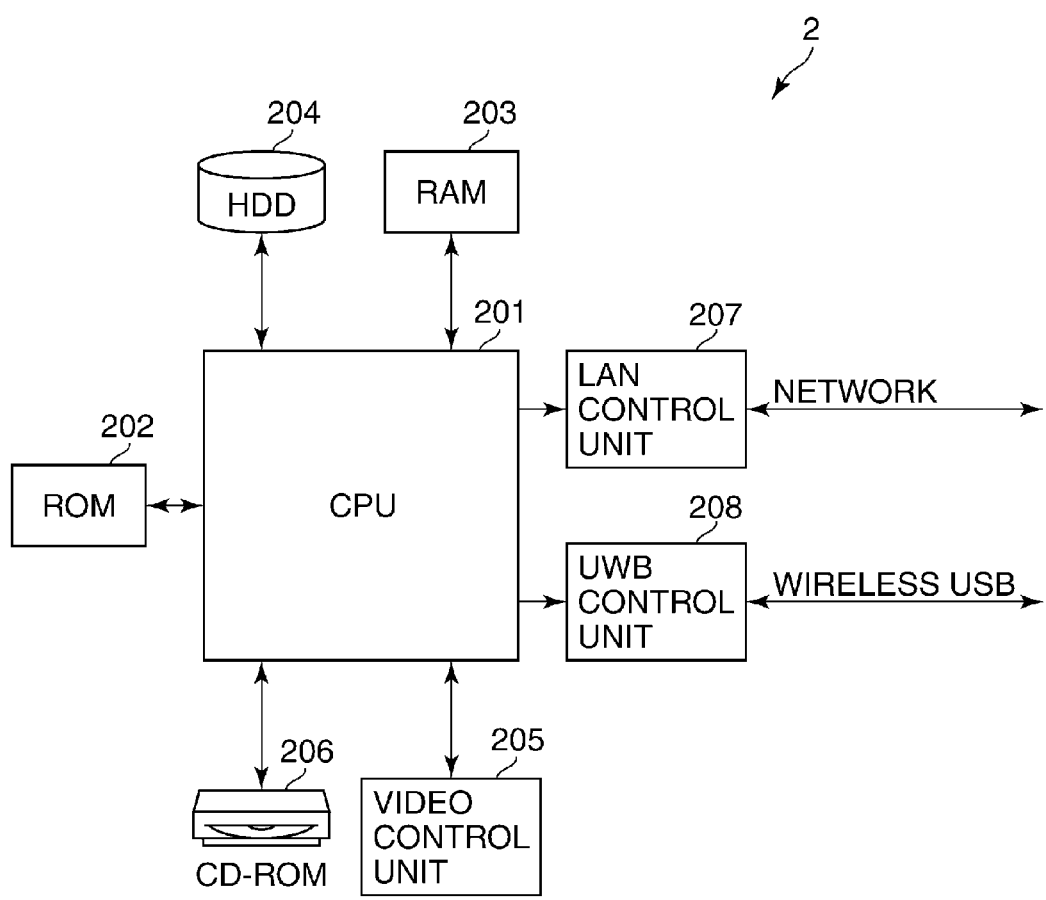
FIG. 3 is a block diagram schematically showing an internal configuration of a host shown in FIG. 1.

Next, an internal configuration of the host 2 will be described with reference to FIG. 3. FIG. 3 is a block diagram schematically showing the internal configuration of the host 2 shown in FIG. 1.

Since the internal configuration of the device 3 shown in FIG. 1 is similar to that of the device 1 fundamentally, the same reference numerals are attached to the elements that have the same functions, and the duplicate description is omitted. The device 3 holds association information required for the association with the host 2 mentioned later like the device 1.

In FIG. 3, a CPU 201 totally controls the host computer as a whole.

A ROM 202 stores a program that controls the host computer as a whole. A RAM 203 functions as a main memory and allows a high-speed access. An HDD 204 is storage storing information and has mirror multiple drives for data protection.

A video control unit 205 improves a writing speed, resolution, and a 3D performance, and achieves an advanced graphic function.

A CD-ROM 206 is used as an interface for backing up information and installing an application, etc.

A LAN control unit 207 controls communications with a client via the network.

An UWB control unit 208 includes an MAC/BB control unit, a data conversion unit, and an RF control unit in its inside, behaves like a host apparatus based on the UWB protocol, and controls the wireless communications with the external information devices.

Next, an association process with an additional device according to the first embodiment of the present invention will be described with reference to FIG. 4, FIG. 5A, FIG. 5B, and FIG. 5C.

Figure 4:
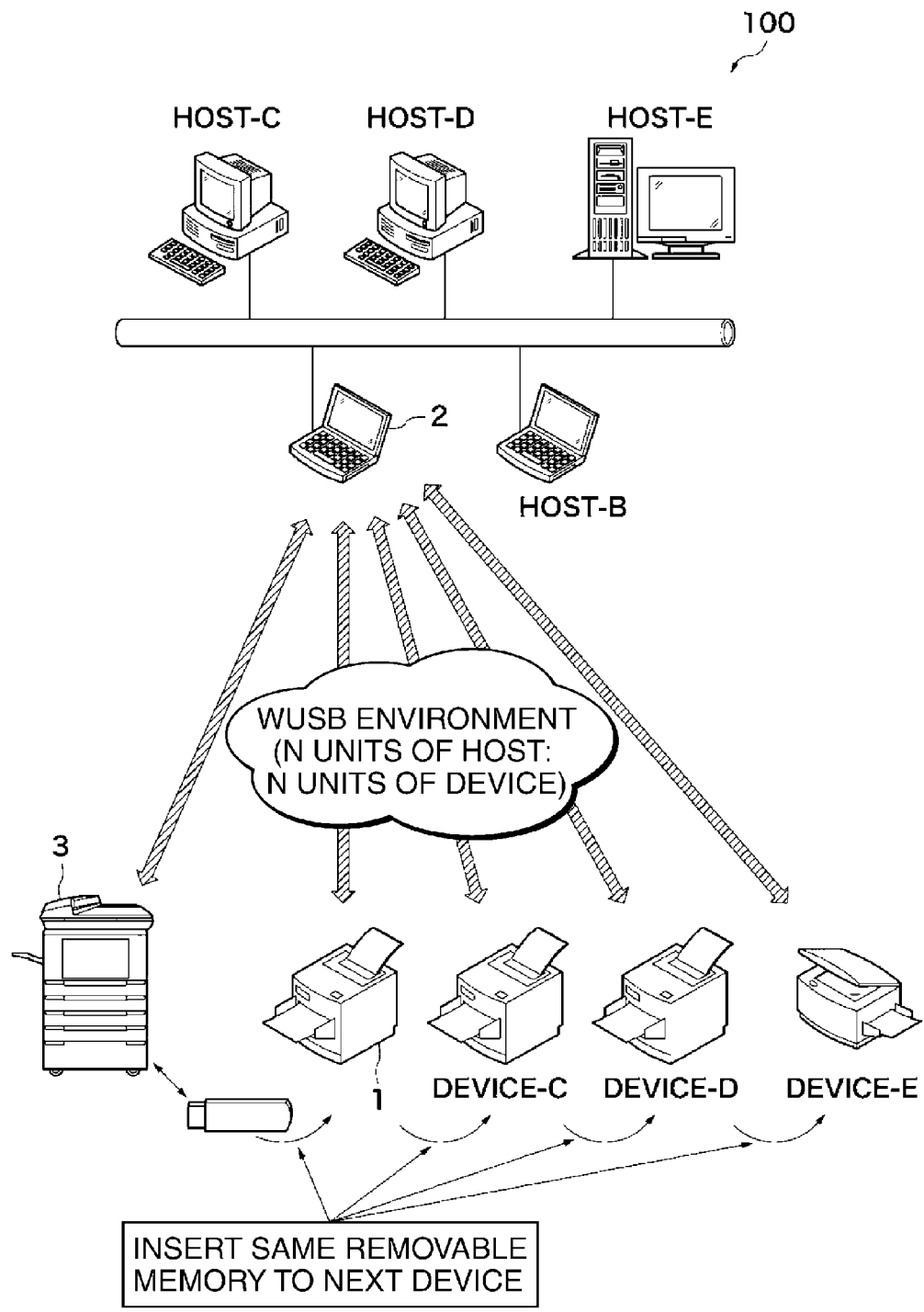
FIG. 4 is a view showing the entire configuration of the wireless connection system according to the first embodiment of the present invention.

FIG. 4 is a view showing the entire configuration of the wireless connection system 100 according to the first embodiment of the present invention.

In FIG. 4, the connections between the host 2 and the other hosts B, C, D, and E has been established via a cable. The connection between the host 2 and the device 3 has been also established by a conventional cable association or a numeric association.

The host 2 has formally registered CC information for the device 3 into the inside when the connection with the device 3 has been established. Accordingly, a user becomes capable of selecting the device 3 from a driver menu of the host 2. Here, the CC information is called the connection context used in order to establish a secure connection between the hosts and the devices.

It should be noted that the host 2 continuously outputs beacon from the start of the association with the device 3 until executing an output stop process mentioned later.

The device 1 and the devices C, D, and E have not established the connections with the host 2 at this time, and can establish the connections with the host 2 as additional devices when started in a special mode in the process shown in FIG. 5A through FIG. 5C mentioned later.

Figure 5A:
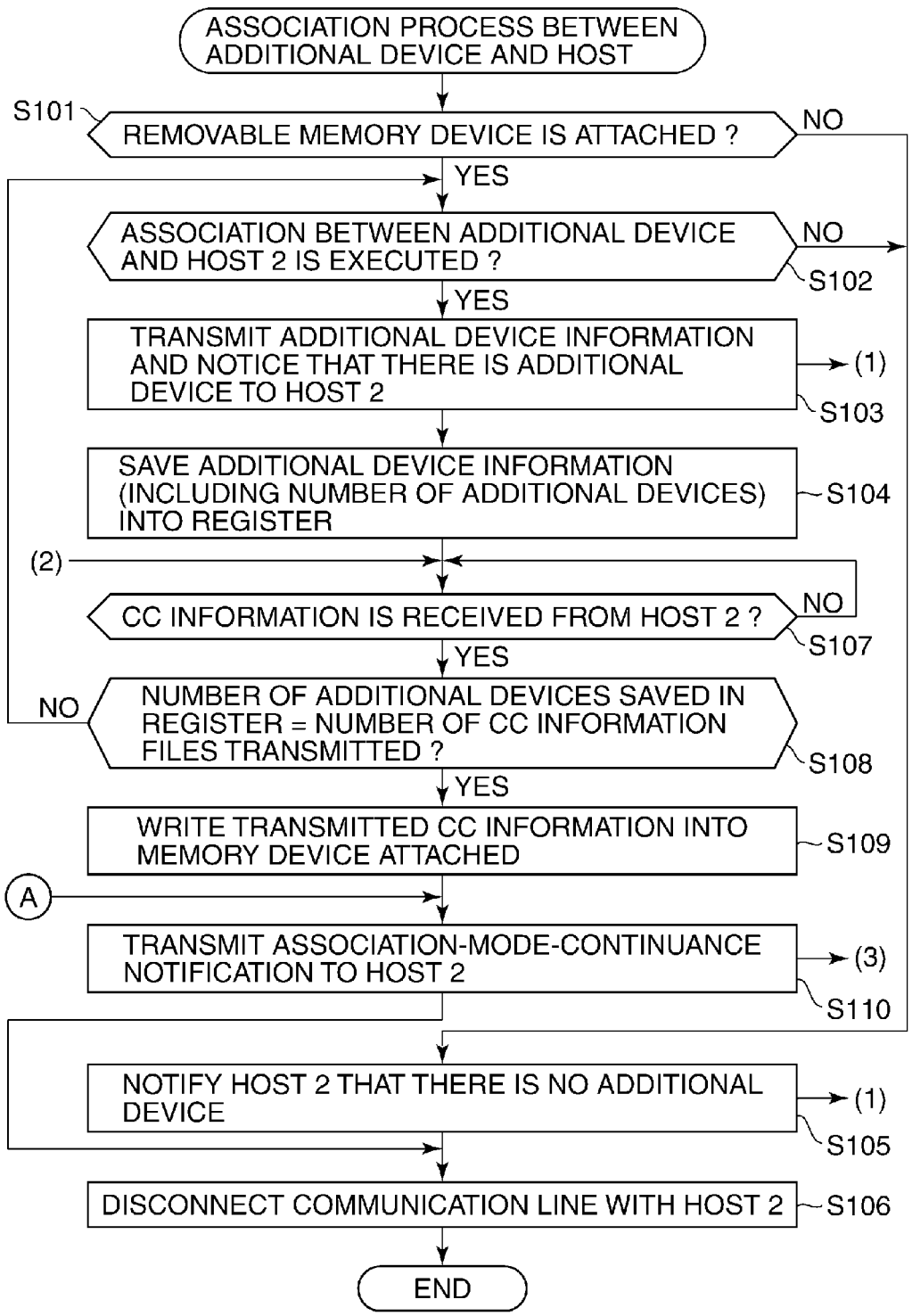

FIG. 5A, FIG. 5B, and FIG. 5C are flowcharts showing procedures of the association process between the additional devices and the host in the wireless connection system 100 in FIG. 4. Here, the process in FIG. 5A is executed by the device 3, the process in FIG. 5B is executed by the host 2, and the process in FIG. 5C is executed by the device 1.

First, the core unit 101 of the device 3 determines whether the I/F unit 114 is equipped with a removable memory (step S101). When it is detected that the unit is equipped with the removable memory as a result of the determination (YES in the step S101), the core unit 101 of the device 3 determines whether the association between the host 2 and the additional devices is further executed (step S102).

Whether the association is executed is determined by a user. That is, an ascertainment screen of whether the association with the additional devices is executed is displayed on the display control unit 109 of the device 3. When the user as a manager inputs that the association with the additional devices is executed on the ascertainment screen, it is determined that the association is executed. It should be noted that the user also inputs the number of the additional devices, when inputting the execution of the association with the additional devices on the ascertainment screen.

As a result of determination in the step S102, when executing a further association with the additional devices (YES in the step S102), the core unit 101 of the device 3 transmits a notice (1), which represents that there is an additional device, to the host 2 (step S103). At the same time, the core unit 101 transmits the additional device information including the above-mentioned number of the additional devices etc. to the host 2. Then, the core unit 101 of the device 3 saves the additional device information to a register (step S104), proceeds with the process to step S107, and waits until a CC information file (2) is received from the host 2.

On the other hand, when it is not detected that the unit is equipped with the removable memory (NO in the step S101) or when it is detected that the unit is equipped with the removable memory but the association with the additional devices is not executed (NO in the step 102), the core unit 101 transmits the notice (1), which represents that there are no additional devices, to the host 2 (step S105), and then, proceeds with the process to step S106. In the step S106, the core unit 101 of the device 3 disconnects a communication line with the host 2, and then, finishes the process.

As shown in FIG. 5B, when receiving the notice (1) of the step S103 or the step S105 from the device 3 (YES in step S201), the host 2 determines whether there is any additional devices based on the received notice (1) (step S202).

When there is no additional devices as a result of determination in the step S202 (NO in the step S202), the host 2 stops outputting the beacon (step S203), disconnects the communication line with the device 3 (step S204), and then, finishes the process.

When there is an additional device as a result of determination in the step S202 (YES in the step S202), the host 2 generates in advance the CC information for the number of the devices to be additionally connected based on the above-mentioned additional device information (step S205). As mentioned above, the CC information consists of a unique host ID (referred to as a "CHID", hereafter), a unique device ID (referred to as a "CDID", hereafter), and a connection key (referred to as a "CK", hereafter) shared between the host ID and the device ID. Regarding the CDID, since the host 2 does not grasp the unique ID of an additional device that actually performs an association at this time, a temporary CDID is designated. When there are a plurality of CC information files generated in advance, header information, which can be used to determine priority when the devices take in the CC information files, is described in the CC information files.

Then, the host 2 saves the CC information files (2) that are common in a file format but are different in the temporary CDID and the CK for the respective additional devices into a register, transfer them to the device 3 (step S206), proceeds with the process to step S207, and waits until receiving a notice (3) from the device 3.

It should be noted that the determination process in the step S102 in FIG. 5A is not limited to the embodiment where the device 3d executes as mentioned above. The host 2 can also execute the process. Specifically, the core unit 101 of the device 3 may command the host 2 to display the ascertainment screen to ascertain whether there is any additional device to the driver menu, and the host 2 may display the ascertainment screen. In the ascertainment screen, a user inputs the number of the additional devices, when inputting that there is an additional device to the driver menu. In this case, the information about the number of the additional devices (referred to as "additional-device-number information") that is designated by the user on the host 2 is transmitted to the device 3 from the host 2, and is stored in the register of the device 3. The CC information is generated in advance based on the number of the additional devices that the user inputs on the host 2 in the step S205.

As shown in FIG. 5A, when receiving the CC information file (2) generated in advance from the host 2 (YES in the step S107), the device 3 determines whether the additional-device-number information stored in the register of itself agrees with the number of the CC information files received (step S108). As a result of determination in the step S108, when not agreeing (NO in the step S108), the process from the step S103 is executed. On the other hand, when agreeing (YES in the step S108), the CC information is written into the removable memory device attached to the I/F unit 114 (step S109).

Then, the device 3 transmits an association-mode-continuance notification (3) to the host 2 (step S110) so that the host 2 executes the association with the additional devices certainly. Then, the device 3 proceeds with the process to step S106, and disconnects the communication line with the host 2.

As shown in FIG. 5B, when receiving the association-mode-continuance notification (3) from the device 3 (YES in the step S207), the host 2 selects the CC information of which header has the highest priority among a plurality of pieces of the CC information generated in advance and stored in the register (step S208). In this case, the host 2 continues outputting the beacon even after the device 3 disconnects the communication line.

It should be noted that it is not necessary to continue outputting the beacon when the host 2 outputs the beacon again after the device 3 disconnects the communication line. For example, the host 2 may once stop the beacon when the communication line with the device 3 is disconnected, and then, the host 2 may select specific CC information from the CC information registered in advance from the driver menu thereof, and may output the beacon in preparation for an association with an additional device.

Although this embodiment selects the CC information of which header has the highest priority among the priority headers that are used when the respective devices take in, the selection condition of the CC information is not necessarily limited to this. For example, if there is no priority header that is used when the respective devices take in, any CC information can be selected. In this case, the host 2 selects CC information arbitrarily. Specifically, the CC information in the removable memory is searched at the additional-device side, and both the host 2 and the additional device mark as "used" on the CC information that has been used to connect at the time when the association is completed. Then, when the host 2 connects with the additional device, the above-mentioned search is performed under a condition where the CC information marked is excluded.

After that, the host 2 waits until one of the devices 1, C, D, and E that are selectable as the additional device in step S209 in FIG. 5B starts in the special mode and transmits a connection request (4). This flowchart describes a case where the device 1 among the devices selectable as the additional device starts in the special mode hereafter to simplify the description.

The device 1 starts in the special mode when the power turns ON by depression of a predetermined switch on the display control unit 109 under a condition where the removable memory to which the CC information generated in advance on the device 3 has been written is equipped to the I/F unit 114 of the device 1.

As shown in FIG. 5C, when the device 1 starts in the special mode (YES in step S301), the device 1 searches the header information in the CC information stored in the memory device, selects the CC information having the highest priority (step S302), and stores it into the register (step S303).

It should be noted that the processes in the steps S302 and S303 are not limited to the above-mentioned embodiment. For example, if there is no priority header in the CC information at the time when the device 1 takes into the register, the device 1 selects the CC information that is the same as the CC information that has been arbitrarily selected by the host 2, and stores it to the register. Specifically, when the device 1 searches a plurality of pieces of the CC information and the association is impossible for a definite period of time with certain CC information, another CC information in the removable memory is selected, and the register is overwritten with the newly selected CC information. The value of the register is fixed at the time when the association is completed.

It should be noted that the register of the device 1 stores a true CDID for performing wireless communications. Accordingly, the temporary CDID in the CC information that the device 1 has taken in and the true CDID is associated conditionally on the connection with the CHID in the CC information during the process in the step S303. As a result of this association process, the operation is controlled so that the device 1 uses the temporary CDID instead of the true CDID only when connecting with the specific CHID.

Then, the association is started between the device 1 with the host 2 that keeps an association mode.

Specifically, the device 1 detects the beacon of the host 2 and identifies the host 2 (YES in step S304). And then, the device 1 transmits the connection request (4) to the host 2, and starts authentication (step S305). At this time, the device 1 generates a session key using the temporary CDID. The CK in the CC information is also necessary to generate the session key. Here, the CK that the host 2 has generated in advance is used.

On the other hand, as shown in FIG. 5B, when receiving the connection request (4) from the device 1 (YES in the step S209), the host 2 generates a session key based on the CK in the CC information selected in the step S208 and the temporary CDID (step S210). Then, the host 2 starts the association with the device 1 using the generated session key (step S211).

Then, as shown in FIG. 5C, the device 1 determines whether the connection between the device 1 and the host 2 is established as a result of agreement of the session keys that have been generated by both (step S306). When determining that the connection between both is established (YES in the step S306), the device 1 deletes only the CC information selected in the step S302 among a plurality of pieces of CC information in the removable memory (step S307). The device 1 performs the process identical to the step S110 and later for the device 3 shown in FIG. 5A.

After that, the process similar to the step S301 and later for the device 1 is also executed for each of the devices C, D, and E according to the additional device information that the user inputs in the step S104.

On the other hand, as shown in FIG. 5B, when the connection between the host 2 and the device 1 has been established (YES in the step S212), the host 2 regularly registers the CC information selected in the step S208. At this time, only the CC information that is regularly registered is deleted among a plurality of pieces of CC information in the register generated in advance (step S213). Then, when there is the CC information in the register generated in advance (YES in step S214), the process from the step S207 is repeated. When all pieces of CC information registered in advance are deleted from the register (NO in the step S214), this process is finished.

As described above, this embodiment does not require to extract one-to-one environment in the association process between the host 2 and the additional devices in the wireless connection system 100 in FIG. 4, when the connection is established between the host 2 and the device 3. Namely, the host 2 generates the CC information for additional devices in advance first at the time of the association between the host 2 and the device 3 (the step S205). Then, the host 2 transmits the CC information to the device 3 (the step S206), and the device 3 stores the CC information generated in advance into the removable memory that is actually equipped (the step S109). Next, when the additional device starts in the special mode (YES in the step S301), the association process is performed between the CC information generated in advance by the host 2 and the CC information that the additional device holds (step S303). Then, the association is performed between the additional device and the host 2 (steps S209 through S212, steps S304 through S306). Accordingly, the load on the user concerning the association is reduced as compared with the prior art.

Next, an association process with an additional device according to a second embodiment of the present invention will be described with reference to the attached figures.

Figure 6:
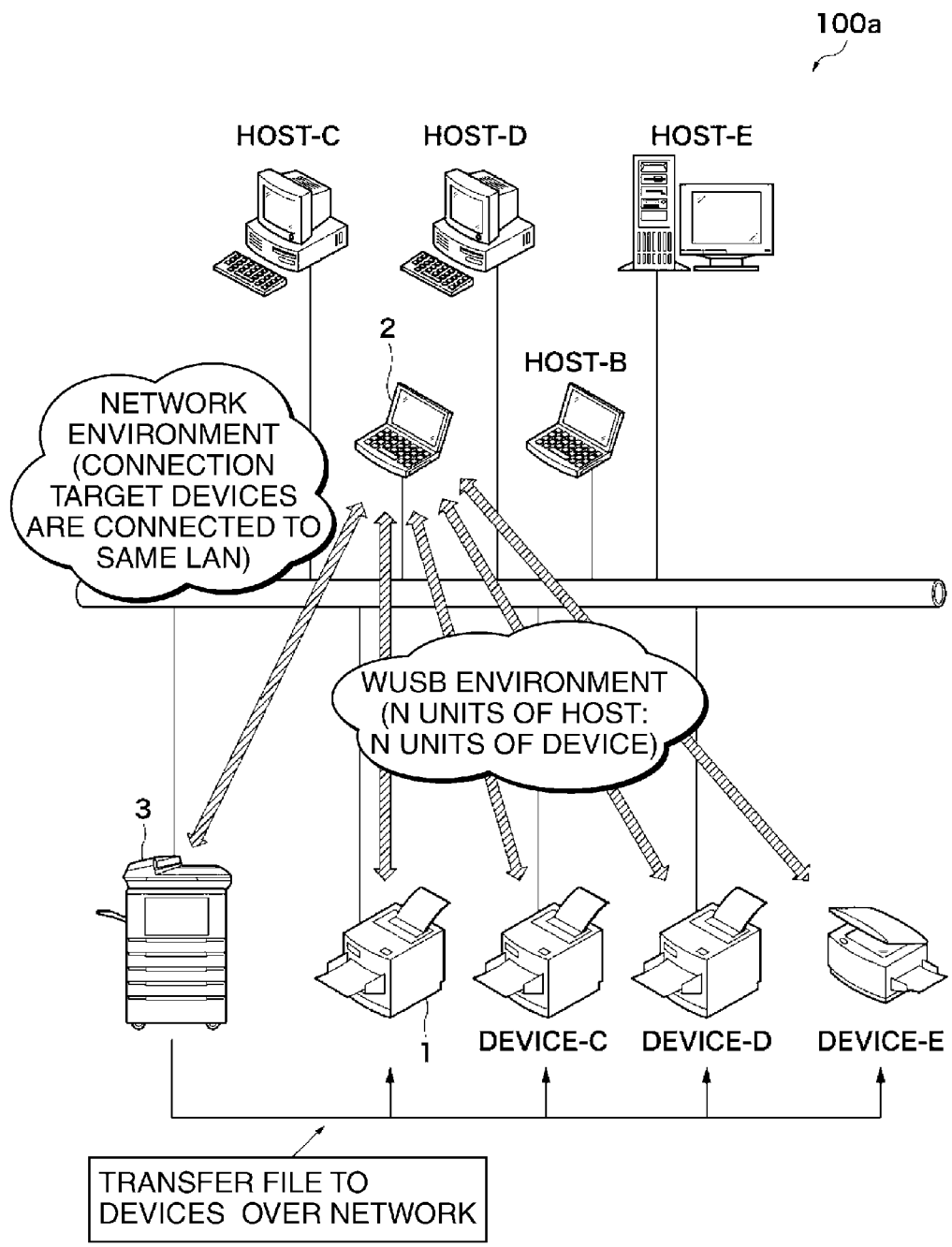
FIG. 6 is a view showing the entire configuration of the wireless connection system according to a second embodiment of the present invention.

FIG. 6 is a detailed view showing the entire configuration of the system 100a according to the second embodiment of the present invention. Since the configuration of the wireless connection system 100a according to the second embodiment is fundamentally identical to that of the first embodiment, the same reference numbers are attached to the duplicated or corresponding parts, and the descriptions thereof are omitted.

In FIG. 6, the hosts 2, B, C, D, and E, the devices 1, 3, C, D, and E are connected via an out-of-band mechanism (specifically, the same LAN), respectively. The connection between the host 2 and the device 3 has established by the conventional cable association or the numeric association. The host 2 has regularly registered the CC information about the device 3 into the internal register at the time when the connection has established. Accordingly, a user is capable of selecting the device 3 from the driver menu of the host 2.

It should be noted that the host 2 continuously outputs the beacon from the start of the association with the device 3 until executing an output stop process mentioned later.

The device 1 and the devices C, D, and E have not established the connections with the host 2 at this time, but have already started. These devices establish the connections with the host 2 as additional devices when moved to the special mode in the process shown in FIG. 7A, FIG. 7B, or FIG. 7C mentioned later.

Figure 7B:
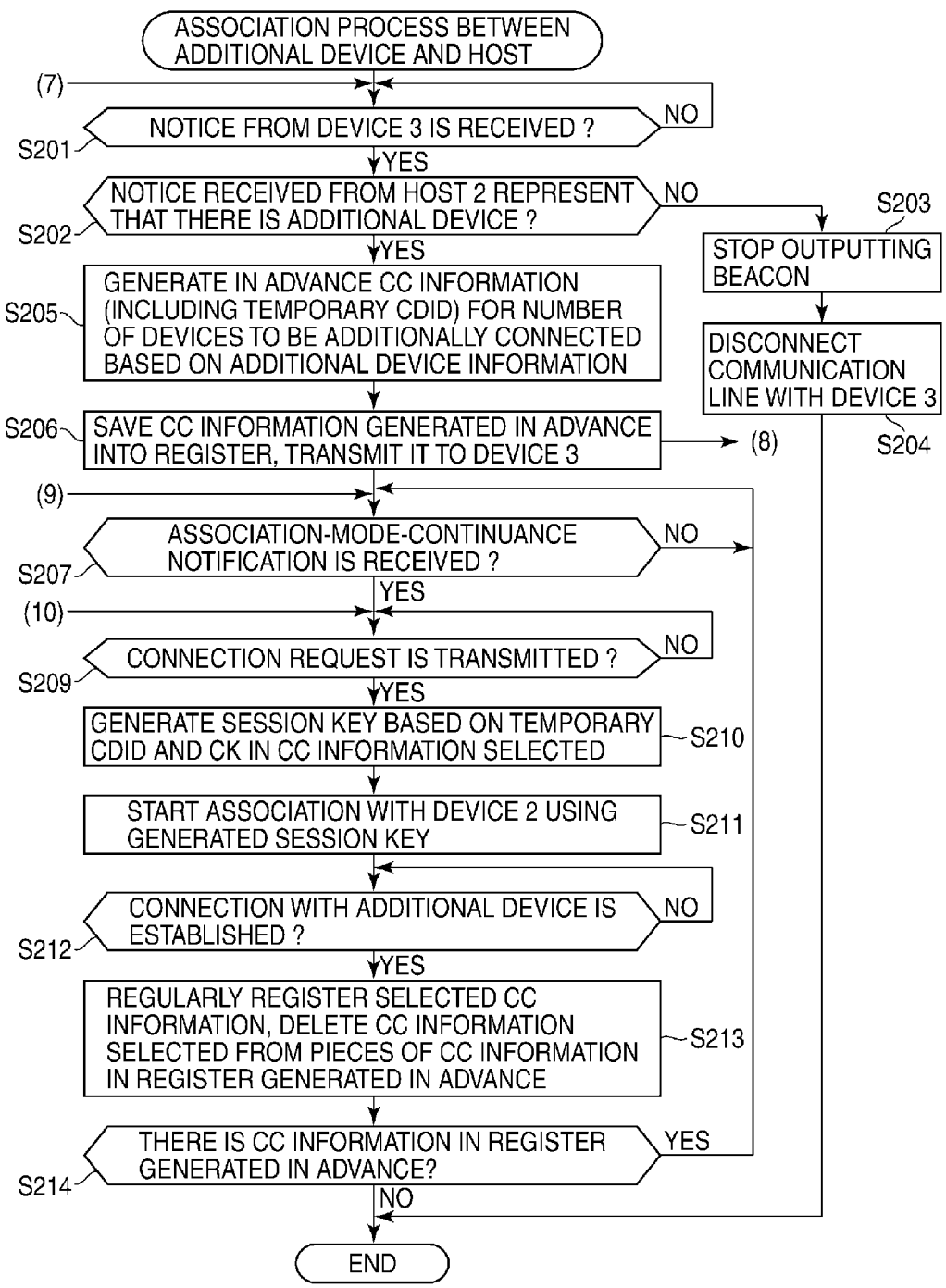
Figure 7C:
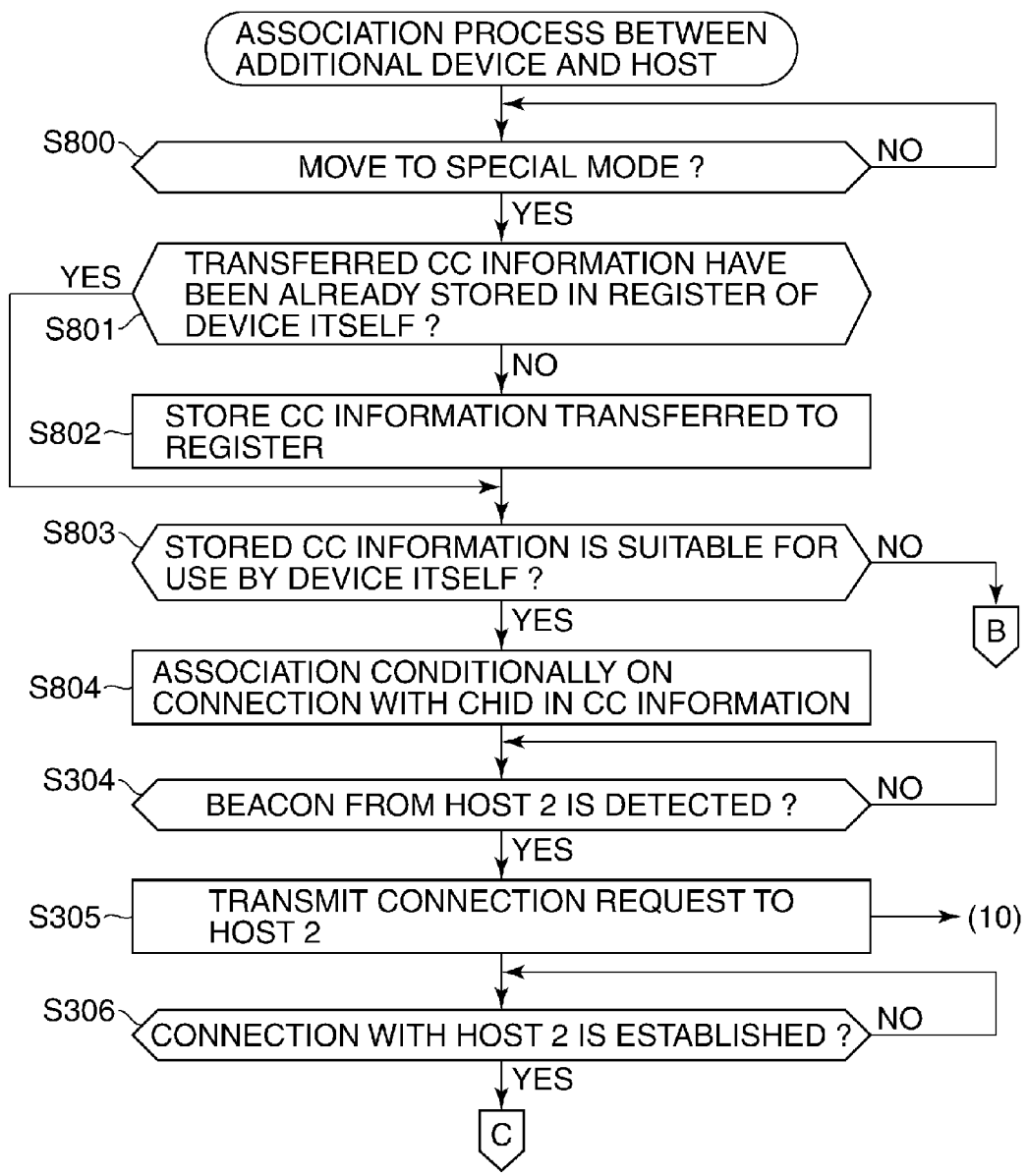

FIG. 7A, FIG. 7B, and FIG. 7C are flowcharts showing procedures of the association process between the additional devices and the host in the wireless connection system 100a in FIG. 6. It should be noted that the same reference numerals are attached to the processes identical to that in FIG. 5A, FIG. 5B, and FIG. 5C and the duplicated descriptions are omitted. Here, the process in FIG. 7A is executed by the device 3, the process in FIG. 7B is executed by the host 2, and the process in FIG. 7C is executed by the device 1.

As shown in FIG. 7A, the core unit 101 of the device 3 determines whether a user requires an additional device (step S701), first.

Specifically, the ascertainment screen of whether the user requires the additional device is displayed on the display control unit 109 of the device 3. When the user as a manager inputs to require the additional device on the ascertainment screen, it is determined that the user requires the additional device. It should be noted that the user also inputs the list of the additional devices, when inputting to require the additional devices on the ascertainment screen.

As a result of determination in the step S701, when requiring the additional device (YES in the step S701), the core unit 101 of the device 3 determines whether the additional device is connected with the same LAN to which the device 3 is also connected via the NIC unit 113 (step S702). Specifically, the list of printing devices currently connected with the LAN to which the device 3 is connected is compared with the list of the additional devices. When an IP address or a physical address of the additional device agrees with that of the printing device, it is determined that the additional device is connected with the same LAN.

As a result of determination in the step S702, when the additional device is connected to the same LAN (YES in the step S702), the core unit 101 of the device 3 transmits a notice (7), which represents that there is an additional device, to the host 2 (the step S103). At the same time, the core unit 101 transmits the additional device information including the above-mentioned number of the additional devices etc. to the host 2. Then, the core unit 101 of the device 3 saves the additional device information to the register (the step S104), proceeds with the process to the step S107, and waits until a CC information file (8) is received from the host 2.

On the other hand, when the additional device is not connected with the same LAN as the device itself or when the association with the additional device is not executed (NO in the step S702 or No in the step S102), the core unit 101 transmits the notice (7), which represents that there is no additional device, to the host 2 (the step S105), disconnects the communication line with the host 2 (the step S106), and finishes the process.

As shown in FIG. 7B, when receiving the notice (7) of the step S103 or the step S105 from the device 3 (YES in the step S201), the host 2 determines whether there is any additional devices based on the received notice (7) (the step S202).

When there is no additional devices as a result of determination in the step S202 (NO in the step S202), the host 2 stops outputting the beacon (the step S203), disconnects the communication line with the device 3 (the step S204), and then, finishes the process.

When there is an additional device as a result of determination in the step S202 (YES in the step S202), the host 2 generates in advance the CC information for the number of the devices to be additionally connected based on the above-mentioned additional device information that is received with the notice (the step S205). As mentioned above, the CC information consists of the CHID, the CDID, and the CK. Regarding the CDID, since the host 2 does not grasp the unique ID of an additional device that actually performs an association at this time, a temporary CDID is designated. When there are a plurality of CC information files generated in advance, header information is added inside the CC information files. Accordingly, the additional device is able to link the physical address or the IP address in the network environment with the CC information file.

Then, the host 2 saves the CC information files (8) that are common in the file format but are different in the CDID and the CK into the register, transfers them to the device 3 (the step S206), proceeds with the process to the step S207, and waits until receiving a notice (9) from the device 3.

As shown in FIG. 7A, when receiving the CC information file (8) generated in advance from the host 2 (YES in the step S107), the device 3 determines whether the additional-device-number information stored in the register of itself agrees with the number of the CC information files received (the step S108). As a result of determination in the step S108, when not agreeing (NO in the step S108), the process returns to the step S701. On the other hand, when agreeing (YES in the step S108), the device 3 transfers the corresponding CC information to each printing device (that becomes one example of the additional device) via the NIC unit 113 based on the above-mentioned list of the additional devices and the header information (step S703).

Then, the device 3 transmits an association-mode-continuance notification (9) to the host 2 (the step S110) so that the host 2 executes the association with the additional devices certainly. Then, the device 3 proceeds with the process to the step S106, and disconnects the communication line with the host 2.

As shown in FIG. 7B, when receiving the association-mode-continuance notification (9) from the device 3 (YES in the step S207), the host 2 continues outputting the beacon even after the device 3 disconnects the communication line.

It should be noted that it is not necessary to continue outputting the beacon when the host 2 outputs the beacon again after the device 3 disconnects the communication line. For example, the host 2 may once stop the beacon when the communication line with the device 3 is disconnected, and then, the host 2 may output the beacon in preparation for an association with an additional device via the driver menu thereof.

After that, the host 2 waits until one of the devices 1, C, D, and E that are selectable as the additional device in step S209 in FIG. 7B moves to the special mode and transmits a connection request (10). This flowchart describes a case where the device 1 among the devices selectable as the additional device moves to the special mode hereafter to simplify the description.

Here, the movement to the special mode in this embodiment means that the association with the host 2 starts by the user's operation on the display control unit 109 after transferring the CC information from the device 3 via the process in the step S703.

As shown in FIG. 7C, when the device 1 moves to the special mode (YES in step S800), the device 1 determines whether the CC information transmitted from the device 3 has been already stored into the register of the device itself (step S801). As a result of the determination in the step S801, when it has been already stored (YES in the step S801), the device 1 proceeds with the process to step S803. When it has not been stored (NO in the step S801), the device 1 stores the CC information transmitted from the device 3 into the register (step S802). Then, the device 1 determines whether the stored CC information is suitable for use by the device itself (step S803).

As a result of determination in the step S803, when it is not suitable for use by the device itself (NO in the step S803), the process returns to the step S701. On the other hand, when it is suitable for use by the device itself (YES in the step S803), the temporary CDID in the CC information that the device 1 has taken in and the true CDID is associated conditionally on the connection with the CHID in the CC information in the same manner as the association process in the step S303 in FIG. 5C. The reason why this process is executed is because the register of the device 1 also stores the true CDID for establishing the wireless connection as mentioned above. As a result of this association process, the operation is controlled so that the device 1 uses the temporary CDID instead of the true CDID only when connecting with the specific CHID.

Then, the association is started between the device 1 with the host 2 that keeps the association mode.

Specifically, the device 1 detects the beacon of the host 2 and identifies the host 2 (YES in the step S304). And then, the device 1 transmits a connection request (10) to the host 2, and starts authentication (the step S305). At this time, the device 1 generates a session key using the temporary CDID. The CK in the CC information is also necessary to generate the session key. Here, the CK that the host 2 has generated in advance is used.

On the other hand, as shown in FIG. 7B, when receiving the connection request (10) from the device 1 (YES in the step S209), the host 2 generates a session key based on the CK in the CC information selected in the step S208 and the temporary CDID (step S210). Then, the host 2 starts the association with the device 1 with the generated session key (the step S211).

Then, as shown in FIG. 7C, the device 1 determines whether the connection between the device 1 and the host 2 is established as a result of agreement of the session keys that have been generated by both (the step S306). As a result of the determination in the step S306, when the connection between both is established (YES in the step S306), the device 1 proceeds with the process to the step S106 shown in FIG. 7A, and finishes this process.

After that, the process similar to the step S800 and later for the device 1 is also executed for each of the devices C, D, and E according to the additional device information that the user inputs in the step S104.

On the other hand, as shown in FIG. 7B, when the connection between the host 2 and the device 1 has been established (YES in the step S212), the host 2 regularly registers the CC information selected. At this time, only the CC information that is regularly registered is deleted among a plurality of pieces of CC information in the register generated in advance (the step S213). Then, when there is the CC information in the register generated in advance (YES in the step S214), the process from the step S207 is repeated. When all pieces of CC information registered in advance are deleted from the register (NO in the step S214), this process is finished.

As described above, this embodiment does not require to extract one-to-one environment in the association process between the host 2 and the additional devices in the wireless connection system 100a in FIG. 6, when the connection is established between the host 2 and the device 3. Namely, the host 2 generates the CC information for additional devices in advance at the time of the association between the host 2 and the device 3 (the step S205). Then, the host 2 transmits the CC information to the device 3 (the step S206), and the device 3 transfers it to the additional devices via the network I/F unit (the step S703). Next, when the additional device moves to the special mode (YES in the step S800), the association process is performed between the CC information generated in advance by the host 2 and the CC information that the additional device holds (step S804). Then, the association is performed between the additional device and the host 2 (the steps S209 through S212, the steps S304 through S306). Accordingly, the load on the user concerning the association is reduced as compared with the prior art.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-267293, filed on Nov. 25, 2009, which is hereby incorporated by reference herein in its entirety.

What is claimed is:

1. A wireless communication system that is capable of establishing a wireless connection between a host computer and devices, which share association information including a host computer identifier (ID) information and a device ID information, the system comprising:
a host computer;
a first device that has established a first wireless connection with said host computer based on first association information including a first device ID information; and
a second device that has not established a second wireless connection with said host computer,
wherein said host computer comprises:
a generation unit configured to generate second association information, including a temporary ID information different from the first device ID information, for the second wireless connection with said second device; and
a transmission unit configured to transmit the second association information to said first device by using the first wireless connection,
wherein said first device comprises:
a storing unit configured to store, when said first device is equipped with a removable memory device, the second association information into the removable memory device,
wherein said second device comprises:
an acquisition unit configured to acquire the second association information from the removable memory device when said second device is equipped with the removable memory device that stores the second association information; and a wireless connection unit configured to establish the second wireless connection with said host computer by using the second association information acquired by said acquisition unit.

2. The wireless system according to claim 1, further comprising:
a connection request unit configured to transmit a connection request by radio from said second device to said host computer;
a first generation unit configured to generate a session key with said second device by said host computer based on the second association information when receiving the connection request; and
an association unit configured to execute an association process to between said second device and said host computer by transmitting the generated session key to said second device.

3. An initial connection method for a wireless communication system having a host computer, a first device that has established a first wireless connection with the host computer based on first association information including a first device identifier (ID) information, and a second device that has not established a second wireless connection with the host computer, the method comprising:
a generation step of generating second association information, including a temporary ID information different from the first device ID information, for the second wireless connection with the second device, said generation step being executed by the host computer;
a transmission step of transmitting the second association information to the first device by using the first wireless connection, said transmission step being executed by the host computer;
a storing step of storing, when said first device is equipped with a removable memory device, the second association information into the removable memory device when equipped with the removable memory device, said storing step being executed by the first device;
an acquisition step of acquiring the second association information from the removable memory device when said second device is equipped with the removable memory device that stores the second association information in said storing step, said acquisition step being executed by the second device; and
a connection step of establishing the second wireless connection with the host computer by using the second association information acquired in said acquisition step, said communication step being executed by the second device.

4. A non-transitory computer-readable storage medium storing a control program causing a computer to execute an initial connection method for a wireless communication system having a host computer, a first device that has established a first wireless connection with the host computer based on first association information including a first device identifier (ID) information, and a second device that has not established a second wireless connection with the host computer, the method comprising:
a generation step of generating second association information, including a temporary ID information different from the first device ID information, for the second wireless connection with the second device, said generation step being executed by the host computer;
a transmission step of transmitting the second association information to the first device by using the first wireless connection, said transmission step being executed by the host computer;

a storing step of storing, when said first device is equipped with a removable memory device, the second association information into the removable memory device when equipped with the removable memory device, said storing step being executed by the first device;

an acquisition step of acquiring the second association information from the removable memory device when said second device is equipped with the removable memory device that stores the second association information in said storing step, said acquisition step being executed by the second device; and a connection step of establishing the second wireless connection with the host computer by using the second association information acquired in said acquisition step, said communication step being executed by the second device.

5. An information processing apparatus that constitutes said host computer included in the wireless communication system according to claim 1.

6. An image forming apparatus that constitutes said first device included in the wireless communication system according to claim 1.

7. An image forming apparatus that constitutes said second device included in the wireless communication system according to claim 1.

8. A wireless communication system that is capable of establishing a wireless connection between a host computer and devices, which share association information including a host computer identifier (ID) information and a device ID information, the system comprising:

a first device that has established a first wireless connection with a host computer based on first association information including the first device ID information; and a second device that has not established a second wireless connection with said host computer, wherein said first device comprises:

a receiving unit configured to receive second association information, including a temporary ID information different from the first device ID information, for the second wireless connection between said host computer and said second device, from said host computer by using the first wireless connection;

a storing unit configured to store, when said first device is equipped with a removable memory device, the second association information into the removable memory device, wherein said second device comprises:

an acquisition unit configured to acquire, when said second device is equipped with the removable memory, the second association information from the removable memory device that stores the second association information; and a wireless connection unit configured to establish the second wireless connection with said host computer by using the second association information acquired by said acquisition unit.

9. The wireless communication system according to claim 1, further comprising a notification unit configured to notify the number of devices, each of which additionally establishes a wireless connection with the host computer, wherein said generation unit generates the association information for the number of the devices notified by said notification unit.

10. The wireless communication system according to claim 1, wherein said transmission unit transmits information indicating priority of each of the association information when said generation unit generates a plurality of pieces of association information.

11. The wireless communication system according to claim 1, wherein, said second device includes a second device ID information, and said generation unit generates the second association information, including the temporary ID information, without use of the second device ID information.

* * * * *